United States Patent [19]

Shoykhet

[11] Patent Number: 5,880,547
[45] Date of Patent: Mar. 9, 1999

[54] INTERNAL TORQUE TUBE FOR SUPERCONDUCTING MOTOR

[75] Inventor: Boris A. Shoykhet, Beachwood, Ohio

[73] Assignee: Reliance Electric Industrial Company, Cleveland, Ohio

[21] Appl. No.: 895,851

[22] Filed: Jul. 17, 1997

[51] Int. Cl.⁶ ................................ H02K 9/00; H02K 3/48
[52] U.S. Cl. .......................... 310/91; 310/61; 310/114; 310/261; 310/52
[58] Field of Search .................. 310/52, 54, 61, 310/261, 91, 67 R, 265, 266, 114, 162

[56] References Cited

U.S. PATENT DOCUMENTS

| | | | |
|---|---|---|---|
| 4,237,392 | 12/1980 | Ying et al. | 310/52 |
| 4,430,589 | 2/1984 | Sakuyama et al. | 310/52 |
| 4,532,445 | 7/1985 | Iwamoto et al. | 310/52 |
| 4,642,495 | 2/1987 | Mori et al. | 310/52 |
| 4,642,503 | 2/1987 | Ueda et al. | 310/214 |
| 5,032,748 | 7/1991 | Sakuraba et al. | 310/52 |

*Primary Examiner*—Thomas M. Dougherty
*Assistant Examiner*—Tran N. Nguyen
*Attorney, Agent, or Firm*—Michael A. Jaskolski; John M. Miller; John J. Horn

[57] ABSTRACT

A rotor supporter for use in superconducting motors including first and second torque tubes secured between first and second rotor shaft ends and a rotor winding support wherein the support is essentially hollow and the tubes are essentially or entirely located inside the support thereby reducing overall rotor length.

18 Claims, 3 Drawing Sheets

INTERNAL TORQUE TUBE FOR SUPERCONDUCTING MOTOR

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE INVENTION

The present invention relates to superconducting motors and more particularly to a reduced size rotor construction including torque tubes positioned inside a rotor support.

Generally, referring to FIG. 1, an AC synchronous superconducting motor 200 includes a rotor support 202 mounted on a rotor shaft 204a and 204b. Rotor windings 206 are arranged around the support forming a rotor assembly. The assembly is mounted inside a stator cavity 208. The stator includes a plurality of stator windings 210 arranged to form cavity 208. A DC current is provided to rotor windings 206 which generates a rotor field inside cavity 208. An AC current is provided to stator windings 210 which generates a magnetic field therearound located at least partially within cavity 208. By time varying the AC current, the stator field is caused to rotate about cavity 208. The rotor and stator fields interact and, as the stator field rotates about cavity 208, the rotor follows.

Three important motor criteria for any type of motor are size, power output and efficiency. High power and reduced size are desirable without compromising efficiency. These three criteria do not go hand in hand. For example, the simplest way to increase motor output is to increase stator and rotor currents. Increased currents result in stronger stator and rotor fields and therefore stronger attraction between the fields. Unfortunately, as currents are increased, so to is the heat generated by the currents as the currents pass through the stator and rotor windings. Energy spent to generate this heat constitutes the majority of input energy losses. Thus, higher heat means lower motor efficiency. At some point, stator and rotor current levels reach a value where the efficiency drops below specified level. In these cases, generally, to increase output further, motor size must be increased.

Recent advances in superconductivity have enabled engineers to design synchronous motors which can theoretically generate relatively high power output for their size when compared to conventional motors. To this end, some motors have been developed which include superconducting rotor coils capable of carrying massive amounts of current through relatively few windings, thus reducing rotor girth and length and thereby reducing overall motor size.

In order to facilitate superconduction, conductors have to be extremely cold (i.e. approximately 5° K. for low temperature superconductors). To this end, referring again to FIG. 1, superconducting rotor supports 202 are located inside a vacuum jacket 209 and connected to first and second shaft ends 204a and 204b, respectively, via first and second torque tubes 212a and 212b, respectively. At least one of the shaft ends 204b forms a passageway 214 from an inlet to an outlet which opens into one of the torque tubes 212a or 212b. The inlet is connected to a refrigeration system 216 which provides a cooling agent (e.g. liquid or gaseous helium) to the support 202 via a supply pipe 207 as well known in the art.

Torque tube configuration is generally governed by tube functions. Tubes are usually formed of stainless steel and have a wall thickness and radius which are sufficient to withstand shaft torque. To minimize heat transfer from shaft ends 204a and 204b to support 202 via the tubes 212a and 212b, tube cross-sectional area is typically kept to a minimum (i.e. tube cross-sectional area acts as a "heat bottleneck" limiting heat transfer). At the same time, tube length is typically relatively long as longer tubes limit heat transfer therethrough.

Unfortunately, typical tube construction and the typical shaft end-tube-support configuration often minimizes the advantages associated with superconducting motors. Because tubes 212a and 212b are provided between shaft ends 204a and 204b and support 202, the tubes directly increase overall motor size. For example, where each tube 212a and 212b is eight inches long, overall motor length $L_1$ (see FIG. 1) must be increased by sixteen inches. Thus, tubes 212a and 212b directly minimize the size advantage associated with a super conducting motor.

One solution to reduce tube heating would be to form tubes 212a and 212b, at least in part, out of a heat insulating material such as glass-epoxy composite. To this end, each tube may be formed of a composite tubular member having first and second ends to be connected to a shaft and support, respectively. It has been found that to withstand typical motor torque, composite fibers should be configured about a tube rotation axis at an angle (e.g. 45°) with respect to the axis such that the fibers extend at least partially axially. These tubes have to be connected to the metal vacuum jacket via a composite/metal joint. The length of the composite/metal joint increases overall motor size.

Such joints may include bolts, rivets, or the like tightened onto the composite in the radial direction (i.e. through the composite member wall essentially perpendicular to the rotation axis and fiber lengths). To this end, each tube may also include first and second metal plate ends which bolt axially to the shaft and support, overlap the composite member axially over a connection distance and radially either internally or externally of the member wall and are bolted radially to the member wall over the connection distance.

While heat transfer can be minimized in this manner, motor size is not. This is because the connection distance required to provide a sufficiently strong joint between the tube and plate ends is relatively long. For example, each connection distance may be on the order of 4 inches. Because there are four joints (i.e. one at each end of each of the two tubes), the joints will often increase motor length by as much as 16 or more inches.

Therefore, it would be advantageous to have a torque tube construction which minimally adds to overall motor size yet isolates the support from the shaft ends.

BRIEF SUMMARY OF THE INVENTION

The present invention includes an inventive superconducting motor rotor construction wherein torque tubes are essentially or entirely located inside a hollow rotor winding support. Typically the space inside the support is unused and therefore the torque tubes can easily be accommodated inside the support. In this manner, tube length only minimally adds to, or does not add to overall motor size.

A primary object of the invention is to reduce overall superconducting motor size. By placing the tubes inside the support, motor size is substantially reduced.

Another object of the invention is to inexpensively reduce motor size. The invention can be implemented with virtually no additional cost as all required components are already provided for a superconducting motor rotor or can be provided by minimally altering existing rotor components.

One other object of the invention is to provide torque tubes which reduce motor size yet do not require a relatively large refrigeration system. To this end, tube length can be increased to the maximum length which can be accommodated inside the support and still allow an adequate structural joint between the tubes and the support at a support midsection. In addition, in one aspect, each tube may include a glass-epoxy composite cylinder and first and second metal tube end connectors at the proximal and distal ends, respectively. Even though connection distances between the cylinder and connectors may have to be relatively long to ensure structural integrity during operation thereby increasing the overall length of the tubes, because the tubes are located inside the support, the extra length does not add to overall motor length and system size. Thus, with the composite tubes located inside the support heat transfer can be minimized and motor length can be reduced.

The invention includes a superconducting motor rotor winding supporter comprising an elongate tubular support formed about a rotation axis having an internal surface and first and second openings at first and second ends, support sections adjacent the first and second ends being first and second sections, respectively, first and second shafts and first and second torque tubes, each tube including proximal and distal ends, the first and second proximal ends secured to the internal surface and essentially located inside the first and second sections, respectively, the first and second distal ends secured to the first and second shafts, respectively, such that the shafts are separated from the support and the shafts, tubes and support are configured for rotation about the rotation axis.

In one aspect the internal surface further includes first and second radially internally extending flanges and the proximal ends are secured to the flanges. Preferably, the proximal and distal ends are bolted to the flanges and the shafts, respectively.

The invention also includes a superconducting motor rotor comprising an elongate tubular support formed about a rotation axis and having an internal surface, first and second openings at first and second ends, supporter sections adjacent the first and second ends being first and second sections, respectively, a rotor winding disposed on the support, first and second shafts, first and second torque tubes, each tube including proximal and distal ends, the first and second tube proximal ends secured to the internal surface and essentially entirely located inside the first and second sections, respectively, the first and second distal ends secured to the first and second shafts, respectively, such that the shafts are separated from the support and a vacuum jacket surrounding the coil and support, whereby the tubes, shaft, support and jacket are configured for rotation about the rotation axis.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

Figure 2:
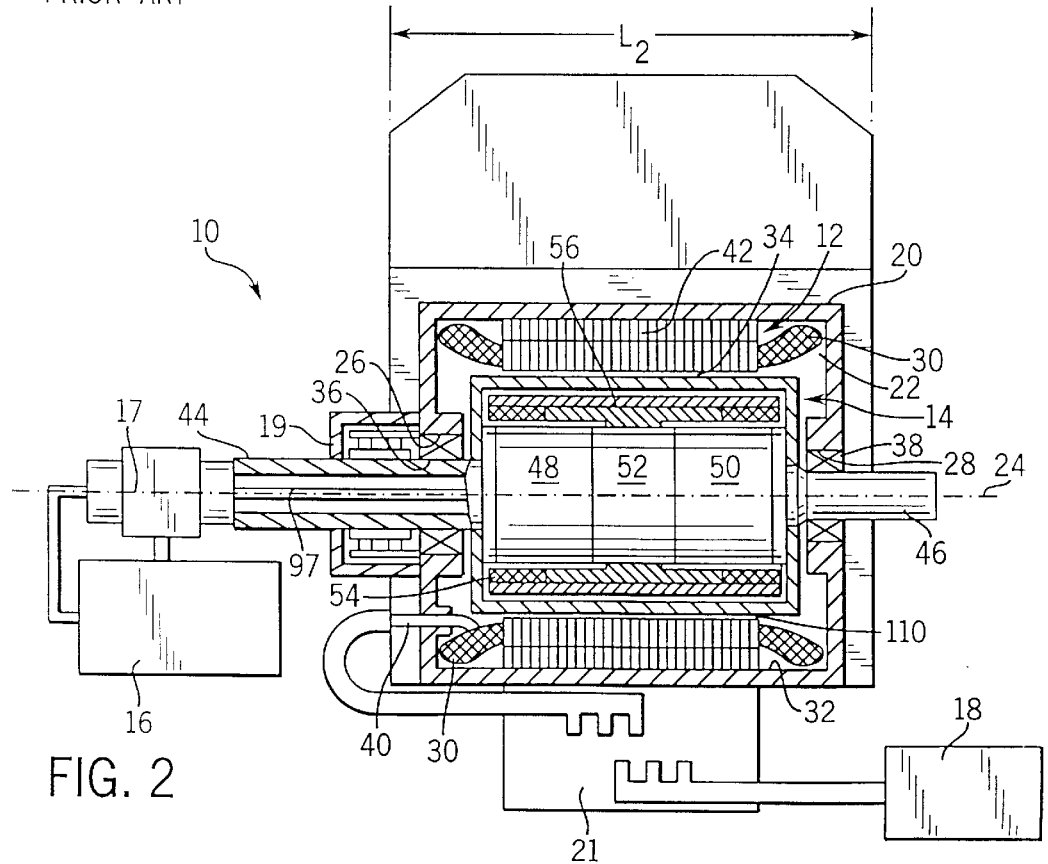
FIG. 2 is a partial cross-sectional view of a superconducting motor including the inventive torque tube construction.

Referring now to the figures wherein like reference numerals correspond to the same components, assemblies, systems and the like and specifically, referring to FIG. 2, the present invention will be described in the context of a superconducting motor system 10. System 10 includes a stator assembly 12, a rotor assembly 14, a cryogenic refrigeration system 16, an agent transfer coupling 17, an inverter 18, a connection box 21, a synchronous DC exciter 19 and various other components which will be described in more detail below.

Stator assembly 12 includes a motor frame 20 which forms a motor chamber 22 about a rotation axis 24, frame 20 forming first and second shaft openings 26, 28 at opposite ends which are centered along axis 24. A plurality of stator windings collectively referred to by numeral 30 are mounted on an internal surface 32 of frame 20, windings 30 forming a stator cavity 34 therebetween. Two ball bearings 36, 38 are provided, one at each opening 26, 28, respectively. Supply lines 40 (only one is shown) connect windings 30 through box 21 to inverter 18 for supplying voltages to windings 30 as well known in the art. A laminated flux shield 42 is provided between frame 20 and windings 30.

Figure 3:
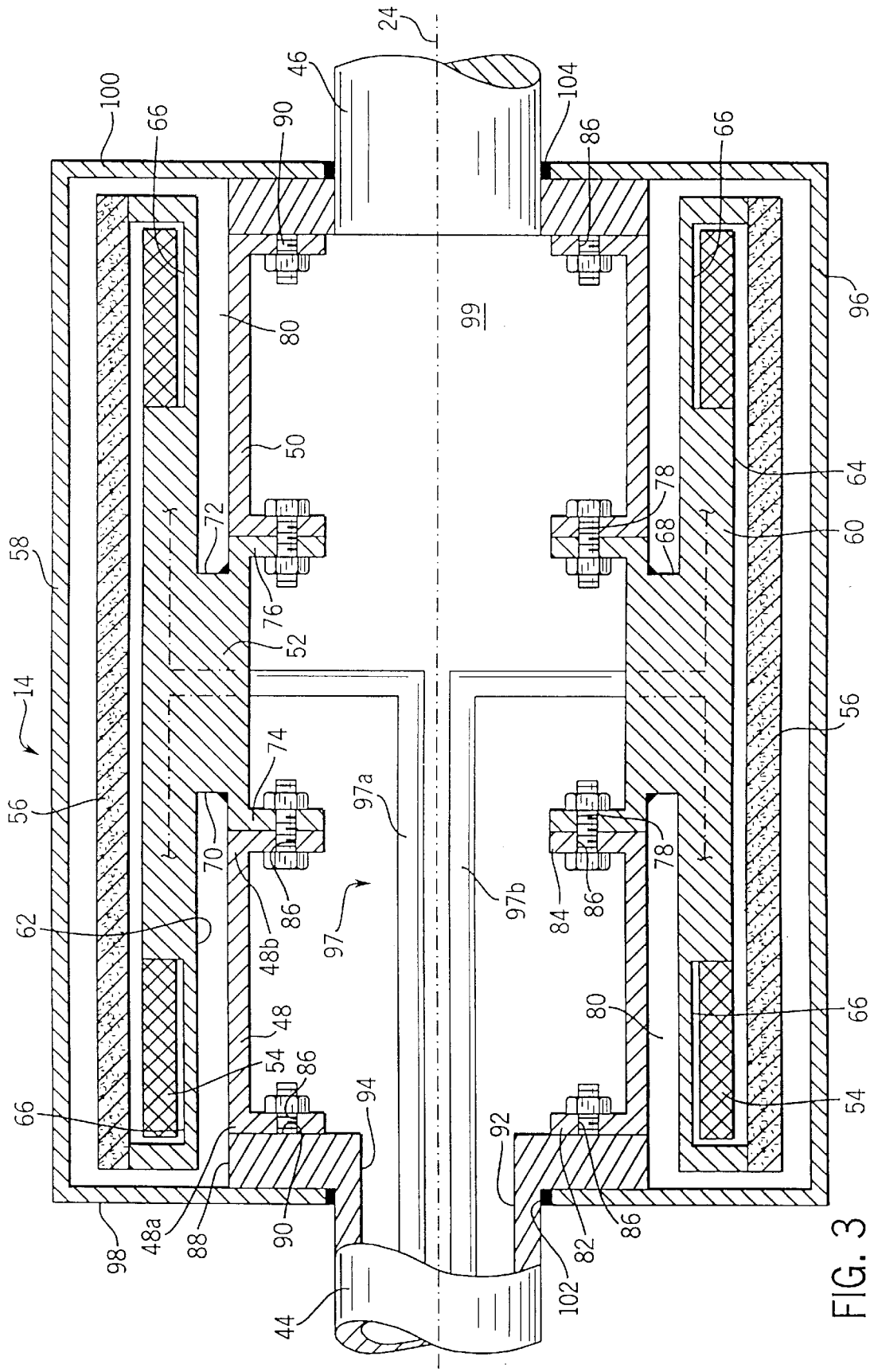
FIG. 3 is an enlarged cross-sectional view of the rotor assembly of FIG. 2.

Referring also to FIG. 3, rotor assembly 14 includes first and second shaft ends 44, 46, respectively, first and second torque tubes 48, 50 respectively, a coil support 52, rotor coils collectively referred to by numeral 54, an AC flux shield 56 and an outer vacuum jacket 58. Support 52 includes a generally cylindrical member 60 having an internal surface 62 and an external surface 64. External surface 64 forms a plurality of recesses collectively referred to by numeral 66 for receiving windings 54. An annular extension 68 extends radially inwardly around the entire circumference of internal surface 62 along a central portion (i.e. extension 68 is equidistant from opposite ends of member 60). Extension 68 has oppositely-facing first and second surfaces 70, 72, respectively. A first annular flange 74 extends radially inwardly from surface 70. Similarly, a second annular flange 76 extends radially inwardly from surface 72. Each flange forms a plurality of bolt receiving apertures collectively referred to by numeral 78 which are parallel to axis 24 and are equispaced about an associated flange 74 or 76. Windings 54 are wound about member 60 within recesses 66 as well known in the art. Shield 56 is provided outside windings 54 and is spaced apart therefrom.

Tubes 48 and 50 are essentially identical and therefore, only tube 48 will be explained in detail here. Tube 48 is generally cylindrical, formed of stainless steel, hollow, and is sized so that it fits within member 60 with a radial air gap 80 therebetween. Tube 48 has first and second ends 48*a*, 48*b* and forms two internally radially projecting annular extensions 82, 84 at the first and second ends 48*a*, 48*b*, respectively. Each extension 82, 84 forms a plurality of bolt apertures collectively referred to by numeral 86 which are parallel to axis 24 and are equispaced around associated extensions. Apertures 86 on extension 84 should be formed so that they are alignable with aperture 78 on flange 74.

First shaft end 44 is cylindrical and hollow and forms a radially outwardly projecting extension 88. Extension 88 forms a plurality bolt ends 90 which extend axially parallel to axis 24, equispaced around extension 88 and should be arranged so as to align with apertures 86. The internal surface 92 of shaft end 44 forms a channel 94. A cryogenic delivery tube 97, including a supply section 97*a* and a return section 97*b*, extends through channel 94 and into the vacuum area 99 within jacket 58.

Second shaft end 46 is similar to shaft end 44 except that it is not hollow. Although not illustrated, end 46 is configured so as to be securely attachable to a load (i.e. end 46 is a drive shaft).

Vacuum jacket 58 includes a generally cylindrical lateral wall 96 and first and second end walls 98, 100 on opposite ends of wall 96. Walls 98 and 100 each form a central aperture 102, 104, apertures 102 and 104 alignable along rotation axis 24. Jacket 58 should be formed of stainless steel.

To assemble assembly 12, tube 48 is positioned within member 60 so that extension 84 is adjacent flange 74 with apertures 86 aligned with apertures 78. Nuts and bolts are used to secure tube 48 to member 60 via apertures 86 and 78. Similarly, tube 50 is secured to flange 76. When so attached, tubes 48 and 50 should only contact support 52 via flanges 74 and 76 so that a radially air gap 80 exists around each tube 48, 50.

With windings 54 arranged inside recesses 66 and shield 56 secured adjacent windings 54, shaft end 44 and wall 98 are attached to tube extension 82 via bolt ends 90 and nuts. Similarly, shaft end 46 and wall 100 are attached to the distal end of tube 50 (see FIG. 3). Tube 97 is arranged as in FIG. 3 and as well known in the art to provide cryogenic coolant through shaft end 44 and tub 48. Jacket 58 encloses tube 48 and 50 and support 52 and is welded to shaft ends 44 and 46 around the edges formed by apertures 102 and 104.

When assembly 12 is configured in the manner described above and as illustrated in FIGS. 1 and 3, tubes 48 and 50 are located within the space defined by support 52. This substantially reduces the overall length of assembly 12 and thereby reduces the overall motor system size of a superconducting motor.

Referring again to FIG. 2, refrigeration system 16, transfer coupling 17, exciter 19, connection box 21 and inverter 18 are all well known in the art and therefore will not be explained here in detail. Assembly 14 is mounted inside cavity 34 so that a gap 110 exists between the external surface of jacket 58 and stator windings 30. Shaft ends 44, 46 extend axially outwardly along axis 24 and are supported by bearings 36, 38 within openings 26, 28. First end 44 is connected to transfer coupling 17 and therethrough to system 16 for receiving cooling agent through channel 94.

In operation, system 16 provides cooling agent through coupling 17, shaft end 44 and tube 48 to support 52. The agent cools windings 54 through extension 68 and member 60.

Figure 1:
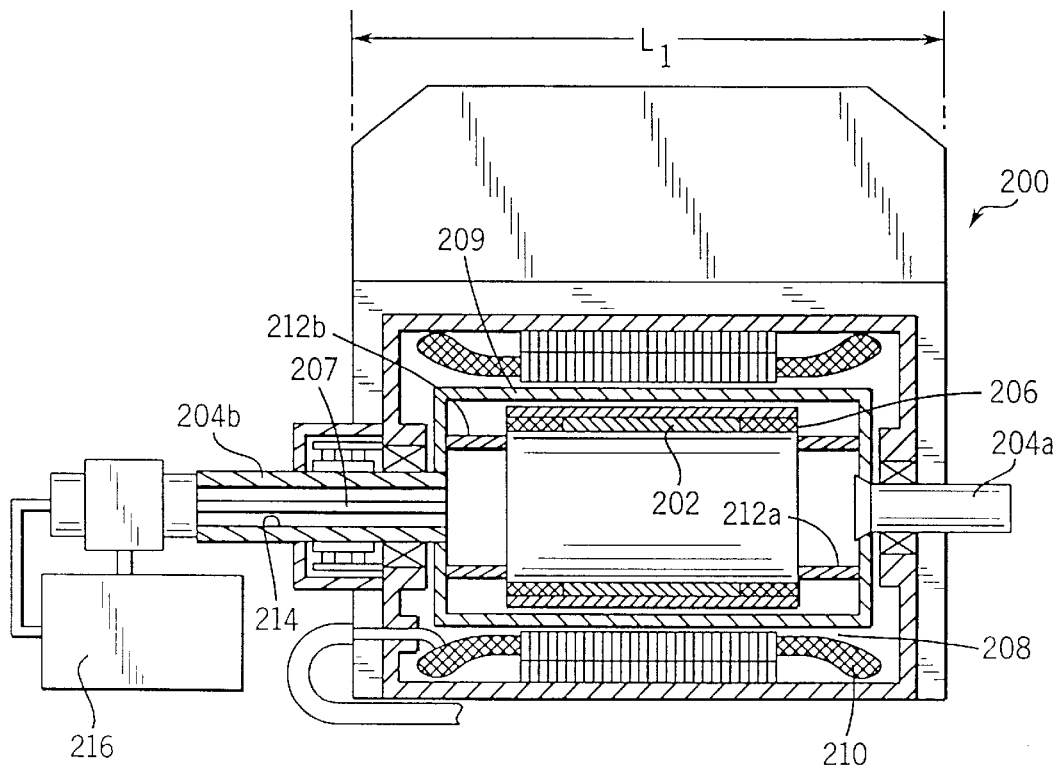
FIG. 1 is a partial cross sectional view of a prior art superconducting motor system including torque tubes.

Referring now to FIG. 1, FIG. 1 illustrates a conventional superconducting system 200. In FIG. 1, torque tubes 212*a* and 212*b* are positioned outside rotor support 202. It should be recognized that the overall length $L_1$ of system 202 is longer than the overall length $L_2$ of system 10 (see FIG. 2) by the combined lengths of tubes 120 and 122. Thus, by placing tubes 48 and 50 inside support 52, overall motor length is reduced by the combined lengths of tubes 48 and 50. Referring to FIG. 3, it should be noted that, gap 80 should be sufficient for multilayer insulation to be located therein to minimize heat transfer by radiation from tubes 48 and 50 and ends 44 and 46 to support 52 thereby making the internal torque tube configuration advantageous.

It should be understood that the apparatuses described above are only exemplary and do not limit the scope of the invention, and that various modifications could be made by those skilled in the art that would fall under the scope of the invention. For example, while the invention is described as one wherein the torque tubes are essentially entirely located inside the support, clearly the invention includes systems wherein the tubes are only partially located inside the support, the important aspect being that the tubes are inside the support to the point where the rotor length is appreciably reduced.

Figure 4:
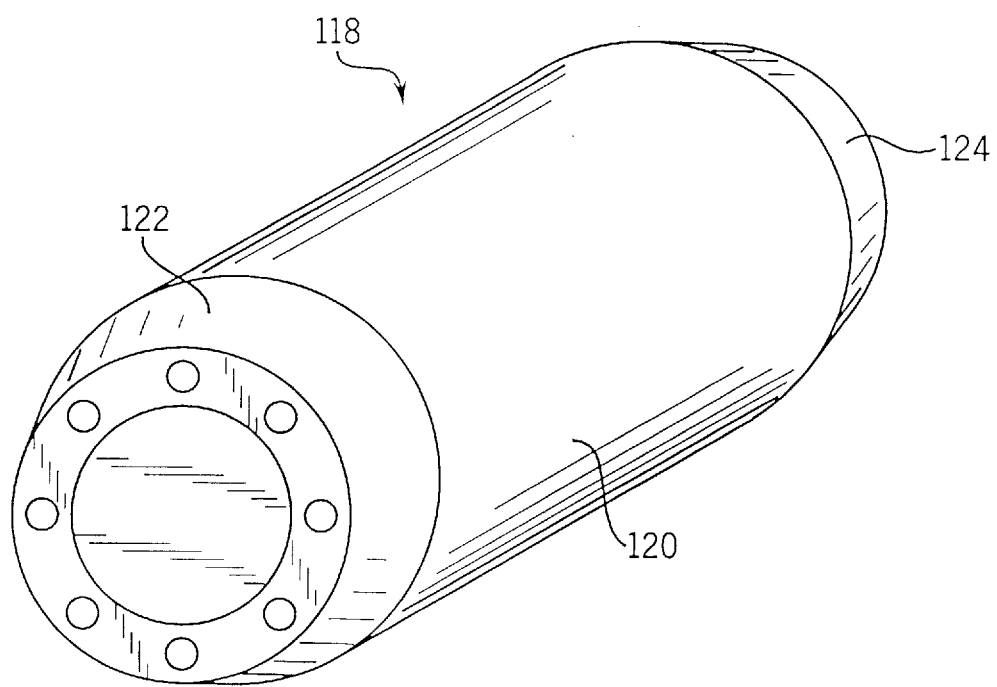
FIG. 4 is a perspective view of a preferred composite torque tube construction.

In addition, while the tubes are illustrated and described as being formed of stainless steel, clearly the tubes could be formed of another material. For example, referring to FIG. 4, therein there is shown a tube construction 118 wherein the tube includes a central glass-epoxy cylinder 120 having stainless steel couplers 122, 124 on either end for connection to a shaft and a support. Even where a connecting distance between the couplers 122, 124 and cylinder 120 is relatively long, because much of the tube is located inside support 52 according to the present invention, increased length to accommodate the connecting distance should not affect overall motor length. This embodiment is advantageous because not only does it reduce motor size when located inside the support, it also reduces tube heat transfer to the support as the composite operates as a thermal insulator.

To apprise the public of the scope of this invention, I make the following claims:

I claim:

1. A superconducting motor rotor winding supporter, comprising:
   an elongate tubular support formed about a rotation axis having an internal surface and first and second openings at first and second ends, support sections adjacent the first and second ends being first and second sections, respectively;
   first and second shafts; and
   first and second torque tubes, each tube including proximal and distal ends, the first and second proximal ends secured to the internal surface and at least partially located inside the first and second sections, respectively, the first and second distal ends secured to the first and second shafts, respectively, such that the shafts are separated from the support and the shafts, tubes and support are configured for rotation about the rotation axis.

2. The supporter of claim 1, wherein the tubes are entirely within the supporter.

3. The supporter of claim 1, wherein each tube is a hollow rigid cylinder.

4. The supporter of claim 1 wherein each tube is at least partially formed of a thermal insulator.

5. The supporter of claim 4 wherein the each tube includes a glass-epoxy composite cylinder and first and second metal tube ends at the proximal and distal ends, respectively.

6. The supporter of claim 1 wherein at least one of the first or second shaft forms an aperture for housing a cryogenic agent delivery tube.

7. The supporter of claim 1 wherein the internal surface further includes first and second radially internally extending flanges and the proximal ends are secured to the flanges.

8. The supporter of claim 1 wherein the tubes have a reduced cross section between the proximal and distal ends such that only the proximal ends touch the internal surface.

9. A superconducting motor rotor, comprising:
   an elongate tubular support formed about a rotation axis and having an internal surface, first and second openings at first and second ends, support sections adjacent the first and second ends being first and second sections, respectively;

a rotor winding disposed on the support;

first and second shafts;

first and second torque tubes, each tube including proximal and distal ends, the first and second tube proximal ends secured to the internal surface and at least partially located inside the first and second sections, respectively, the first and second distal ends secured to the first and second shafts, respectively, such that the shafts are separated from the support; and a vacuum jacket surrounding the coil and support;

whereby the tubes, shaft, support and jacket are configured for rotation about the rotation axis.

10. The rotor of claim 9, wherein the tubes are entirely entirely within the support.

11. The rotor of claim 9, wherein each tube is a hollow rigid cylinder.

12. The support of claim 9, wherein each tube is at least partially formed of a thermally insulating material.

13. The rotor of claim 12, wherein the each tube includes a glass-epoxy cylinder and first and second metal tube ends at the proximal and distal ends, respectively.

14. A superconducting motor rotor winding supporter comprising:

an elongate tubular support formed about a rotation axis having an internal surface and first and second openings at first and second ends, support sections adjacent the first and second ends being first and second sections, respectively;

first and second shafts; and first and second torque tubes, each tube including proximal and distal ends and formed of a glass-epoxy composite cylinder and first and second metal tube ends at the proximal and distal ends, respectively, the first and second proximal ends secured to the internal surface and at least partially located inside the first and second sections, respectively, the first and second distal ends secured to the first and second shafts, respectively, such that the shafts are separated from the support and the shafts, tubes and support are configured for rotation about the rotation axis.

15. A superconducting motor rotor winding supporter, comprising:

an elongate tubular support formed about a rotation axis having an internal surface and first and second openings at first and second ends, support sections adjacent the first and second ends being first and second sections, respectively, the internal surface further including first and second radially internally extending flanges;

first and second shafts; and first and second torque tubes, each tube including proximal and distal ends, the first and second proximal ends secured to the flanges and at least partially located inside the first and second sections, respectively, the first and second distal ends secured to the first and second shafts, respectively, such that the shafts are separated from the support and the shafts, tubes and support are configured for rotation about the rotation axis.

16. The supporter of claim 15 wherein the proximal and distal ends are bolted to the flanges and the shafts, respectively.

17. A superconducting motor rotor winding supporter, comprising:

an elongate tubular support formed about a rotation axis having an internal surface and first and second openings at first and second ends, support sections adjacent the first and second ends being first and second sections, respectively;

first and second shafts; and first and second torque tubes, each tube including proximal and distal ends, the first and second proximal ends secured to the internal surface and at least partially located inside the first and second sections, respectively, the first and second distal ends secured to the first and second shafts, respectively, such that the shafts are separated from the support and the shafts, tubes and support are configured for rotation about the rotation axis and, wherein the tubes have a reduced cross section between the proximal and distal ends such that only the proximal ends touch the internal surface.

18. A superconducting motor rotor, comprising:

an elongate tubular support formed about a rotation axis and having an internal surface, first and second openings at first and second ends, support sections adjacent the first and second ends being first and second sections, respectively;

a rotor winding disposed on the support;

first and second shafts;

first and second torque tubes, each tube including proximal and distal ends and formed of a thermally insulating glass-epoxy cylinder and first and second metal tube ends at the proximal and distal ends, respectively, the first and second tube proximal ends secured to the internal surface and at least partially located inside the first and second sections, respectively, the first and second distal ends secured to the first and second shafts, respectively, such that the shafts are separated from the support; and a vacuum jacket surrounding the coil and support;

whereby the tubes, shaft, support and jacket are configured for rotation about the rotation axis.

* * * * *